Sept. 29, 1942.                J. GÜNTHER                2,297,407
                MAGNETIC DEFLECTING SYSTEMS FOR CATHODE RAY TUBES
                              Filed March 1, 1940
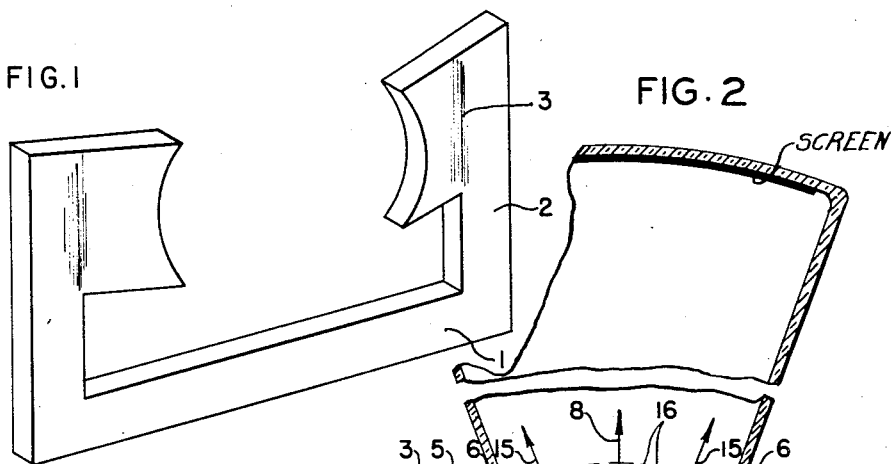
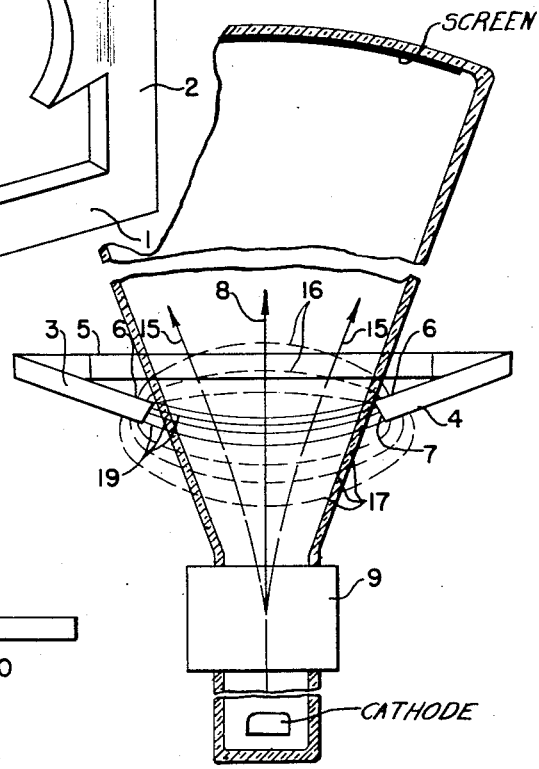
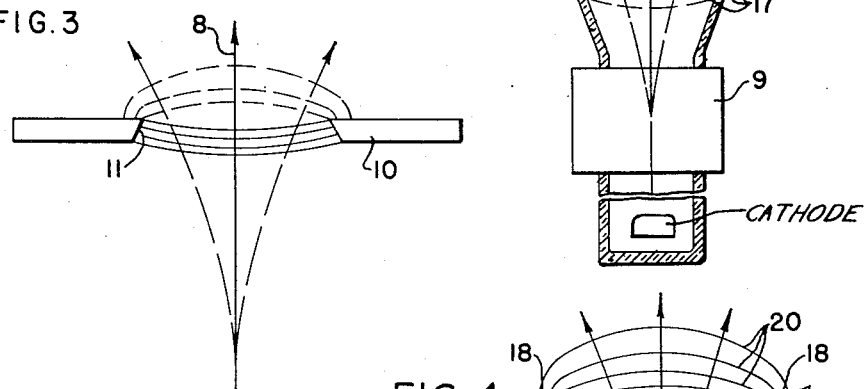
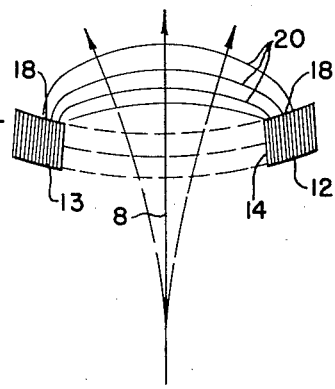
INVENTOR
JOHANNES GÜNTHER
BY
ATTORNEY Patented Sept. 29, 1942

2,297,407

UNITED STATES PATENT OFFICE 2,297,407

MAGNETIC DEFLECTING SYSTEMS FOR CATHODE-RAY TUBES

Johannes Günther, Berlin-Zehlendorf, Germany; vested in the Alien Property Custodian Application March 1, 1940, Serial No. 321,629
In Germany March 10, 1939

4 Claims. (Cl. 250—156)

The invention relates to magnetic deflecting systems for cathode-ray tubes particularly for television purposes. It is concerned with deflecting systems including coils and preferably containing an iron core for producing a magnetic field in the path of the cathode ray.

It is an object of the present invention to provide on the outside of a cathode-ray tube a deflecting system which is adapted to produce on the screen of the tube a rectangular scanning field. It is a further object to avoid barrel or pincushion shaped distortions of the scanning field, having a detrimental effect on the reproduction of the television image or in case of an oscillograph tube on the shape of the curve under observation. Such distortions can arise for instance on account of the curvature of the screen surface if for instance the radius of curvature of the screen is larger than the length of the deflected cathode ray. Distortions are also produced in tubes in which the centre of curvature of the screen lies on the side of the screen opposite from the deflecting system.

It has been found that the form of the scanning field and thereby the linearity of the scanned lines is influenced by the angle between the cathode ray and the plane in which the curved lines of force of the deflecting field are situated and furthermore by the degree of curvature of the lines of force.

It is therefore a particular object of the invention to provide a deflecting field the main portion of which contains lines of force having a certain curvature and to produce simultaneously therewith a stray field the lines of force of which have another curvature so that distortions of the scanning field are compensated.

According to the invention the lines of force of the main deflecting field have a curvature opposite that of the lines of force of the stray field, through which the cathode ray passes, after it has passed through the main deflecting field. The lines of force of the main deflecting field are preferably curved convexly in the direction of the cathode ray while the stray field has concavely curved lines of force. The combined effect of the main field and the deflecting field produces a deflection of such a kind that barrel or pincushion shaped distortions can be partly or entirely compensated on any kind of a flat or curved screen. It is also possible to produce a desired distortion of any shape, as, for example, a trapezoidal form of the scanning field.

Further features and particulars of the invention will be described in connection with several embodiments represented by way of example in the drawing in which:

Fig. 1 is a perspective view of an iron yoke of a deflecting system according to the invention, Figs. 2 and 3 are plan views of yokes of similar form while Fig. 4 is a plan view of a further embodiment.

Fig. 1 represents an iron yoke 1 used, for example, for the vertical or image deflecting component of a cathode ray produced in a television tube. The figure does not show the coils situated upon the yoke which may have conventional form. The yoke has two arms 2 ending in pole pieces 3. The neck of the cathode-ray tube itself has conventional form and has such a position that the tube axis is perpendicular to the plane 5 of the yoke. The pole pieces are situated at an angle relatively to the plane of the yoke. The lines of force produced between the pole pieces are represented in Fig. 2. The main deflecting field is indicated by unbroken lines 19 between the front planes 7 of the yoke. These front planes have an inclination with respect to each other so that the edges lying towards the screen of the tube are closer together than the edges lying towards the cathode of the tube. The undeflected cathode ray is indicated by the arrow 8. The position of the deflected cathode ray is indicated by arrows 15. A stray field 16 indicated by broken lines is produced between the side planes 6 of the pole pieces and another stray field 17 indicated by broken lines is produced between the side planes 4. The lines of force 16 have a curvature opposite that of the lines of force 19 of the main field between the planes 7. The cathode ray 8 passes through a first deflecting system 9 and is deflected by this system so that it moves from one end position 15 to the other end position. The cathode ray is therefore influenced by different sections of the main field 19 and of the stray fields 16 and 17. The influence of the stray field 17 can be neglected because the stray field 16 has a much stronger effect in comparison thereto. The lines of force between the planes 6 have according to the invention a stronger density than the lines of force 17 so that the cathode ray is influenced by this stray field more strongly than by the stray field 17 and the desired compensating effect is produced.

The desired curvature of the lines of force of the main field and of the stray field can also be effected by a deflecting arrangement represented in Fig. 3. This figure shows a plan view of the pole pieces of the deflecting yoke. The poles 10 are cut with an angle at their front surfaces 11 so that a similar field distribution is obtained as in Fig. 1.

Another form of deflecting system is shown in Fig. 4. The yoke 13 consists in this case of single sheets 12 of iron lying parallel to the axis of the cathode ray 8 so that the main field is produced between the planes 14 indicated by dotted lines while the stray field 20 exists between the surfaces 18. This arrangement is adapted, for example, to compensate a barrel shaped distortion produced by a too strongly convex curvature of the screen.

The invention is not limited to the represented forms of deflecting yokes. Fields of similar distribution can be produced by deflecting coils including no iron yoke, particularly by a suitable formation of the front conductors of the coils. In order to produce a strong compensating effect it is preferable to deflect the cathode ray by the first deflecting system, for example, a line deflecting system, into regions of the field having a stronger curvature than the central part of the field. This effect can be strengthened or weakened by suitably choosing the distance between the two deflecting systems.

It is also possible to produce scanning fields of particular form so that distortions of an optical reproducing system are compensated by the form of the scanning field.

What I claim is:

1. A magnetic deflecting system for a cathode-ray tube having a cathode and a screen, including a magnetic core having pole pieces intermediate the cathode and screen, said pole pieces having opposing surfaces inclined toward each other in such a manner that the edges of said surfaces lying nearer said screen have a shorter distance between them than the edges of said surfaces lying nearer said cathode.

2. A magnetic deflecting system for a cathode-ray tube having a cathode and a screen, including a core of magnetic laminations having arm portions extending inwardly toward the axis of said tube, said laminations in said arm portions extending substantially parallel to said axis and said arm portions being concavely curved with respect to said screen, whereby the spacing of said laminations of said arm portions from said screen decreases with increasing distance from the axis of said cathode-ray tube.

3. In combination, a cathode-ray tube comprising a cathode and a screen, and a magnetic deflecting system comprising a magnetic core intermediate the cathode and screen, said core including a yoke and pole pieces extending from the yoke toward the axis of said tube and enclosing between their free ends a cross section of the electron beam emitted from said cathode, the pole pieces describing an angle with respect to the plane of the yoke and the faces of said pole pieces describing an acute angle with respect to the axis of the tube.

4. In combination, a cathode-ray tube comprising a cathode and a screen, and a magnetic deflecting system comprising a magnetic core intermediate the cathode and screen, said core including a yoke and pole pieces extending from the yoke at an angle to its plane toward the axis of said tube and enclosing between their free ends a cross section of the electron beam emitted from said cathode, said pole pieces being disposed with respect to said yoke in such a manner that their free ends lie closer to said cathode than the ends connected to said yoke.

JOHANNES GÜNTHER.